May 13, 1947.  N. L. BROWN  2,420,351
VEHICLE DECELERATION SIGNAL
Filed Oct. 6, 1945
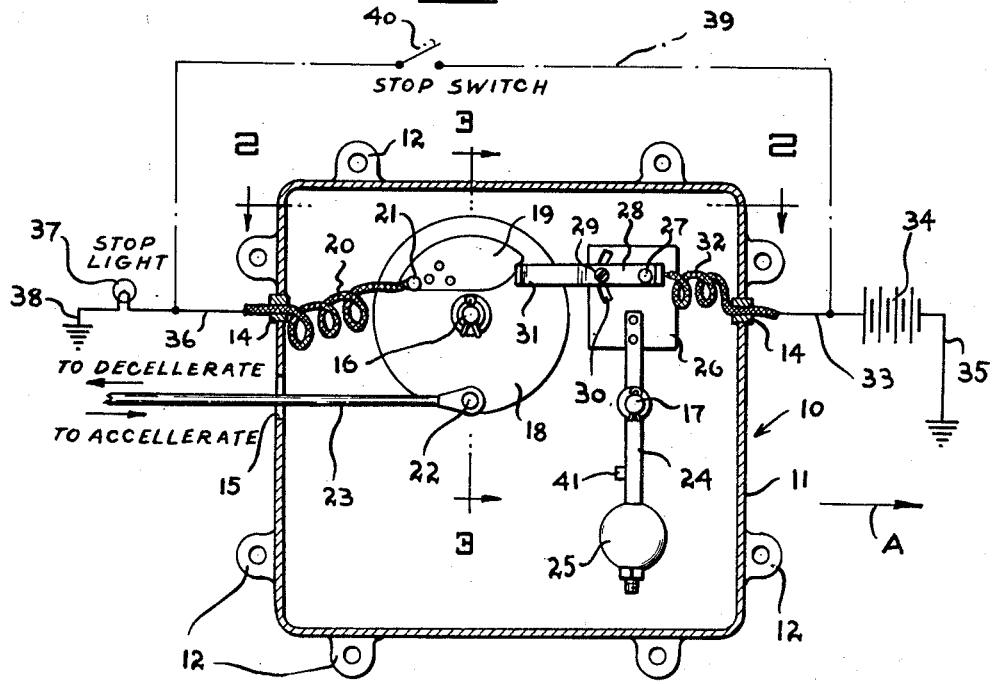
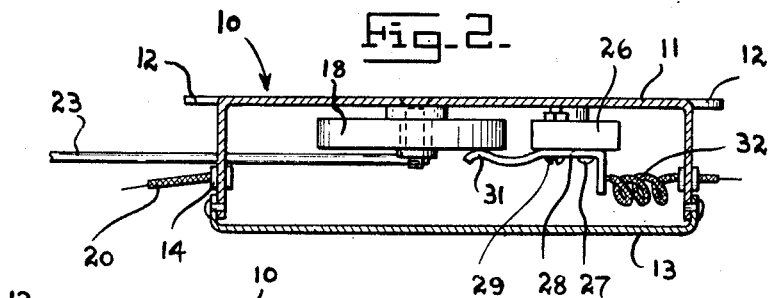
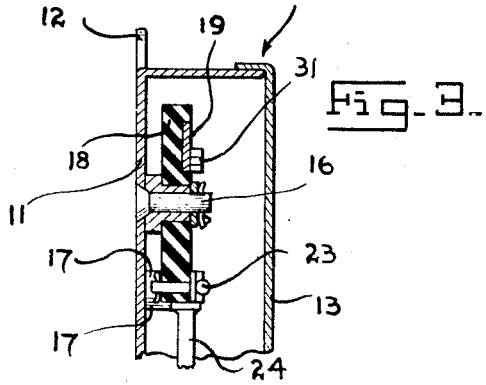
Inventor
NORMAN L. BROWN Patented May 13, 1947

2,420,351

UNITED STATES PATENT OFFICE 2,420,351

VEHICLE DECELERATION SIGNAL

Norman L. Brown, Velasco, Tex.

Application October 6, 1945, Serial No. 620,691

2 Claims. (Cl. 177—311)

This invention relates to a warning signal and more particularly to signalling means by which the driver of a trailing vehicle may be notified of the decelerating of a leading vehicle.

It is a matter of common knowledge that many accidents occur through the inadequate warning to the driver of a trailing vehicle as to the intentions of the driver of a leading vehicle. Such accidents endanger the life and limb of the occupants of the vehicles and moreover result in large monetary losses through the damage to the vehicles and the consequent necessity for repair. While it is recognized that an attempt has been made through the use of the commonly known "stop light," the warning given thereby is not always adequate, particularly when vehicles are moving at high speed and after dark, for the reason that the stop lights commonly employed depend entirely on the application of the brakes of the leading vehicle, with the result that the deceleration which usually occurs between the time of the removal of the foot of the operator on the accelerator pedal to the application of the brake is usually imperceptible to the driver of a trailing vehicle, with the result that the leading vehicle may slow down to such a degree that a collision is inevitable.

The primary object of this invention is to save the occupants of vehicles from injury and also to effect monetary savings through the avoidance of property damage such as may be caused by inadequate signalling.

Another object of the invention is to notify the driver of a trailing vehicle of the deceleration of a leading vehicle during the interim between the removal of the foot of the driver of the leading vehicle from the accelerator thereof and the actual application of the brakes to such vehicle.

The above and other objects may be attained by employing this invention, which embodies among its features a warning signal which includes a contact which moves in unison with the accelerator of the leading vehicle, a pendulum-actuated contact adapted, when the speed of the leading vehicle decreases, to engage the first-mentioned contact and a warning signal in circuit with the contacts to indicate to the driver of a trailing vehicle the fact of the deceleration of the leading vehicle.

Other features include a switch having a rotatably mounted insulating disk carrying a contact plate, a pendulum-actuated insulating block carrying a yielding contact finger adapted, under certain conditions, to engage the contact plate on the disk and complete a circuit through a warning signal, and means connecting the disk with the accelerator of the vehicle whereby the disk will be rotated to move its contact plate further away from the contact finger as the acceleration of the vehicle increases and to advance the contact plate toward the contact finger as the speed of the vehicle decreases.

In the drawings:

Figure 1 is a vertical sectional view through a switch device embodying the features of this invention, showing, diagrammatically, the position of the switch device in circuit with a signal, such as a stop light, Figure 2 is a horizontal sectional view taken substantially on the line 2—2 of Figure 1, and Figure 3 is a vertical sectional view taken substantially on the line 3—3 of Figure 1.

Referring to the drawings in detail, a casing designated generally 10 comprising a shallow box-like body 11 carrying attaching ears 12 by means of which the device may be mounted in any suitable location on a vehicle, is provided with a cover 13 for enclosing the mechanism to be more fully hereinafter described. The end walls of the body 11 are provided with apertures for the reception of suitable insulating grommets 14 and formed in one side immediately below the grommets 14 is an opening 15, the purpose of which will be more fully hereinafter explained. Extending inwardly from the bottom wall of the casing 11 are horizontally disposed pivot shafts 16 and 17, the purpose of which will be more fully hereinafter explained. Rotatably mounted on the pivot shaft 16 is a disk 18 formed of a suitable insulating material such as hard fiber and embedded in the outer face of the disk 18 is a contact plate 19 to which a flexible lead wire 20 is soldered or otherwise connected, as at 21. Pivoted, as at 22, to the disk 18 is a rod 23, the opposite end of which is connected to the accelerator mechanism of the vehicle upon which the device is mounted in such a manner that as the accelerator is moved to increase the speed of the vehicle, the disk 18 will be rotated in a counterclockwise direction when viewed as in Figure 1, and when the accelerator mechanism is moved to decrease the speed of the vehicle, the disk 18 will move in a clockwise direction, as will be readily understood upon reference to the drawings.

Pivotally mounted on the pivot pin 17 is a pendulum arm 24, carrying, at its lower end, a vertically adjustable pendulum weight 25 and at its upper end a block 26 of insulating material such as hard fiber. Pivotally attached, as at 27, to the block 26 is a contact finger 28 which is pierced to receive an adjusting bolt 29 which operates in a slot 30 to adjustably support the finger 28 about its pivot. The end of the finger 28 opposite that which is pivoted at 27 is provided with a plurality of longitudinal slits and is bent, as at 31, so as to yieldingly ride upon the face of the disk 18, as will be readily appreciated upon reference to the drawings. A flexible conductor 32 is connected to the finger 28 in any suitable manner to form a good electrical contact and the end of the conductor 32, like the end of the conductor 20, leads through its respective grommet 14 to the exterior of the casing 11. The conductor 32 is connected in any suitable manner as by lead wire 33 to a source of power 34 such as a storage battery or accumulator, and the opposite terminal of this power source is connected through a lead 35 to ground, as will be readily appreciated upon reference to Figure 1. The cable or conductor 20 is, in turn, connected through the medium of a suitable lead wire 36 to a signalling device 37 such as a signal lamp which, in turn, is connected through the lead 38 to ground. It will thus be seen that when the contact finger 28 engages the contact plate 19, the circuit will be completed through the signal device 37 and the latter, in case it is a lamp, will be illuminated.

The switch may be utilized in conjunction with the ordinary stop light commonly employed on a motor vehicle, by shunting it across between the power source and the stop light so that the normal operation of the stop light need not be interfered with. The ordinary stop light circuit is indicated in dotted lines at 39 in Figure 1 and a conventional stop light switch 40 may be employed therewith as will be readily understood.

In operation, the device is installed in a vehicle in such a manner that the pendulum will swing upon deceleration of the vehicle, a stop 41 being provided to limit the swing of the pendulum under acceleration of the vehicle. Assuming that the direction of travel of the vehicle is as indicated by the arrow A, it will be obvious that upon acceleration of the vehicle, the pendulum 24 will remain stationary against the stop 41, but as soon as the speed of the vehicle is retarded, the pendulum will swing in the direction of the arrow A so as to cause the contact finger 28 to engage the contact plate 19 and complete the circuit through the signal 37.

By properly adjusting the finger 28 about the pivot point 27, the sensitivity of the device may be readily controlled so that the warning may be given upon the slightest retardation of the speed of the vehicle. Conversely the adjustment may be such as to preclude the giving of a false signal when descending a grade such as is encountered on an ordinary highway. By rotating the disk 18 under the influence of the accelerator of the vehicle, it is obvious that the contact plate 19 may be moved further away from the finger 28 as the pressure is applied to the accelerator pedal, but that as soon as the pressure is released from the accelerator pedal, the disk 18 will rotate in such a manner that the plate 19 will approach the finger 28 and if the rapidity of deceleration is sufficient, the pendulum weight 25 will swing in the direction of the arrow A and move the finger 28 into contact, thus completing the circuit.

From the foregoing, it will be obvious that an extremely sensitive warning signal may be provided to notify the driver of a trailing vehicle of the fact of the deceleration of the leading vehicle in ample time to avert a collision.

While in the foregoing there has been shown and described the preferred embodiment of this invention, it is to be understood that minor changes in the details of construction and combination and arrangement of parts may be resorted to without departing from the spirit and scope of the invention as claimed.

What I claim is:

1. A warning signal adapted to indicate to the driver of a trailing vehicle the deceleration of a leading vehicle which includes a pair of normally spaced contacts, means operable in unison with the accelerator of the leading vehicle to increase the distance between the contacts as the speed of the said leading vehicle increases, pendulum means to decrease the distance between the contacts when the speed of the leading vehicle slackens, and a signal in circuit with the contacts to indicate to the driver of a trailing vehicle the fact of the deceleration of the leading vehicle.

2. A signal comprising a disk of insulating material mounted to rotate concentrically about a horizontal pivot, a contact plate embedded in one side of the disk, a pendulum mounted to swing about a horizontal pivot near the disk, a block of insulating material carried by the pendulum, a yielding contact finger carried by the block and riding on the face of the disk in which the contact plate is embedded, means connected to the disk for rotating it about its pivot in unison with the movements of the accelerator of a motor-driven vehicle, a stop to limit the swing of the pendulum in one direction and a signal lamp in circuit with the contacts whereby, when the contacts engage one another, the lamp will be lighted.

NORMAN L. BROWN.